US012283775B2

(12) United States Patent
Yamanashi et al.

(10) Patent No.: US 12,283,775 B2
(45) Date of Patent: Apr. 22, 2025

(54) SHIELD CONNECTOR INCLUDING SHELL HAVING FACING SURFACE SPACED AWAY FROM ENGAGEMENT PIECE TO REGULATE OUTWARD DEFORMATION OF REGULATION PIECE

(71) Applicant: Yazaki Corporation, Tokyo (JP)

(72) Inventors: Daisuke Yamanashi, Shizuoka (JP); Takashi Sone, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 377 days.

(21) Appl. No.: 17/960,790

(22) Filed: Oct. 5, 2022

(65) Prior Publication Data

US 2023/0115291 A1 Apr. 13, 2023

(30) Foreign Application Priority Data

Oct. 11, 2021 (JP) ................................ 2021-166563

(51) Int. Cl.

| | |
|---|---|
| ***H01R 13/648*** | (2006.01) |
| ***H01R 13/506*** | (2006.01) |
| ***H01R 13/52*** | (2006.01) |
| *H01R 103/00* | (2006.01) |

(52) U.S. Cl.

CPC ......... *H01R 13/648* (2013.01); *H01R 13/506* (2013.01); *H01R 13/5205* (2013.01); *H01R 2103/00* (2013.01)

(58) Field of Classification Search

None

See application file for complete search history.

(56) References Cited

U.S. PATENT DOCUMENTS

| | | | | |
|---|---|---|---|---|
| 2012/0270444 | A1* | 10/2012 | Kawamura | H01R 13/5202 439/607.44 |
| 2015/0050826 | A1* | 2/2015 | Tashiro | H01R 13/502 439/278 |
| 2015/0340801 | A1 | 11/2015 | Tashiro et al. | |
| 2016/0329651 | A1* | 11/2016 | Yamaguchi | H01R 13/44 |
| 2021/0066849 | A1 | 3/2021 | Takagi et al. | |
| 2022/0037830 | A1* | 2/2022 | Aoshima | H01R 13/4223 |
| 2022/0255260 | A1* | 8/2022 | Kudo | H01R 13/506 |

FOREIGN PATENT DOCUMENTS

| | | |
|---|---|---|
| JP | 2014-154359 A | 8/2014 |
| JP | 2021-39889 A | 3/2021 |

* cited by examiner

*Primary Examiner* — Oscar C Jimenez

(74) *Attorney, Agent, or Firm* — KENEALY VAIDYA LLP

(57) ABSTRACT

A shield connector includes: a cylindrical housing that accommodates a terminal and holds the terminal; an annular seal member that seals between an outer peripheral surface of an electric wire connected to the terminal and an inner wall surface of the housing; a holder coupled to the housing along an axial direction of the housing to support the seal member; and a conductive shell that accommodates and holds the housing and the holder coupled to each other therein, in which an outer wall portion of the housing has a protruding portion protruding outward, the holder has an engagement piece extending along the axial direction and is coupled to the housing by engaging the engagement piece with the protruding portion from an outside, and the shell has a facing surface facing the engagement piece from an outside, and regulates outward deformation of the engagement piece by the facing surface.

4 Claims, 12 Drawing Sheets

SHIELD CONNECTOR INCLUDING SHELL HAVING FACING SURFACE SPACED AWAY FROM ENGAGEMENT PIECE TO REGULATE OUTWARD DEFORMATION OF REGULATION PIECE

CROSS-REFERENCE TO RELATED APPLICATION(S)

The present application claims priority to and incorporates by reference the entire contents of Japanese Patent Application No. 2021-166563 filed in Japan on Oct. 11, 2021.

BACKGROUND OF THE INVENTION

1. Field of the Invention

The present invention relates to a shield connector.

2. Description of the Related Art

Conventionally, there is a shield connector. Japanese Patent Application No. 2021-39889 discloses a connector including a housing, a rear holder which is held by the housing, and a rubber stopper which is sandwiched between the housing and the rear holder.

In a shield connector, it is desirable to be able to improve the robustness of a coupling portion so that the coupling between a housing and a holder is not easily released. The robust coupling portion can improve water cut-off performance.

SUMMARY OF THE INVENTION

An object of the present invention is to provide a shield connector capable of improving the robustness of the coupling portion between the housing and the holder.

In order to achieve the above mentioned object, a shield connector according to one aspect of the present invention includes a cylindrical housing that accommodates a terminal and holds the terminal; an annular seal member that seals between an outer peripheral surface of an electric wire connected to the terminal and an inner wall surface of the housing; a holder coupled to the housing along an axial direction of the housing to support the seal member; and a conductive shell that accommodates and holds the housing and the holder coupled to each other in the conductive shell, wherein an outer wall portion of the housing has a protruding portion protruding outward, the holder has an engagement piece extending along the axial direction and is coupled to the housing by engaging the engagement piece with the protruding portion from an outside, and the shell has a facing surface facing the engagement piece from an outside, and regulates outward deformation of the engagement piece by the facing surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A shield connector according to embodiments of the present invention will be described in detail below with reference to the drawings. Note that the present invention is not limited by the embodiments. Further, the components in the following embodiments include those which can be easily assumed by those skilled in the art or those which are substantially the same.

Embodiment

Figure 1:
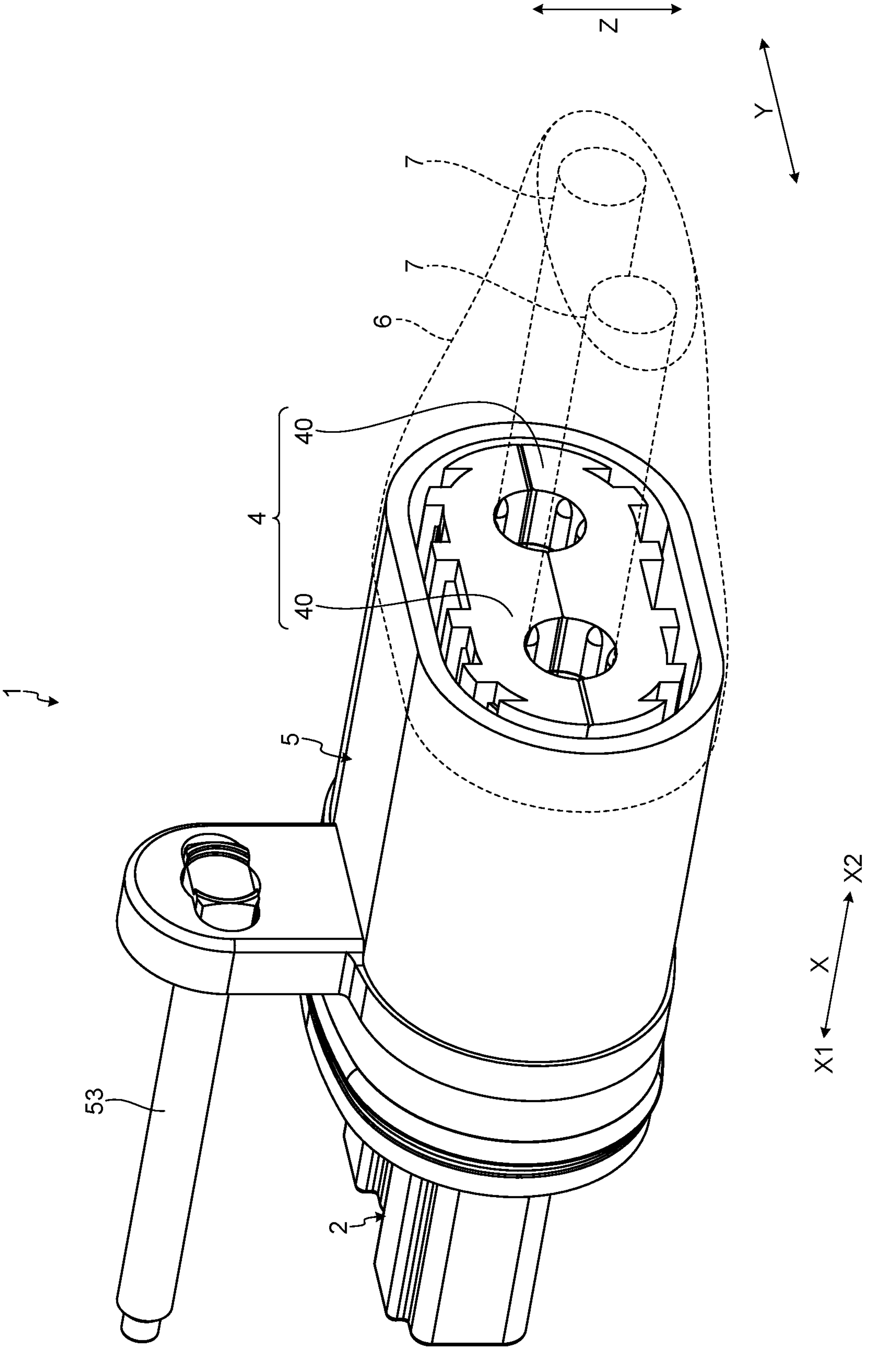
FIG. 1 is a perspective view of a shield connector according to an embodiment.
Figure 2:
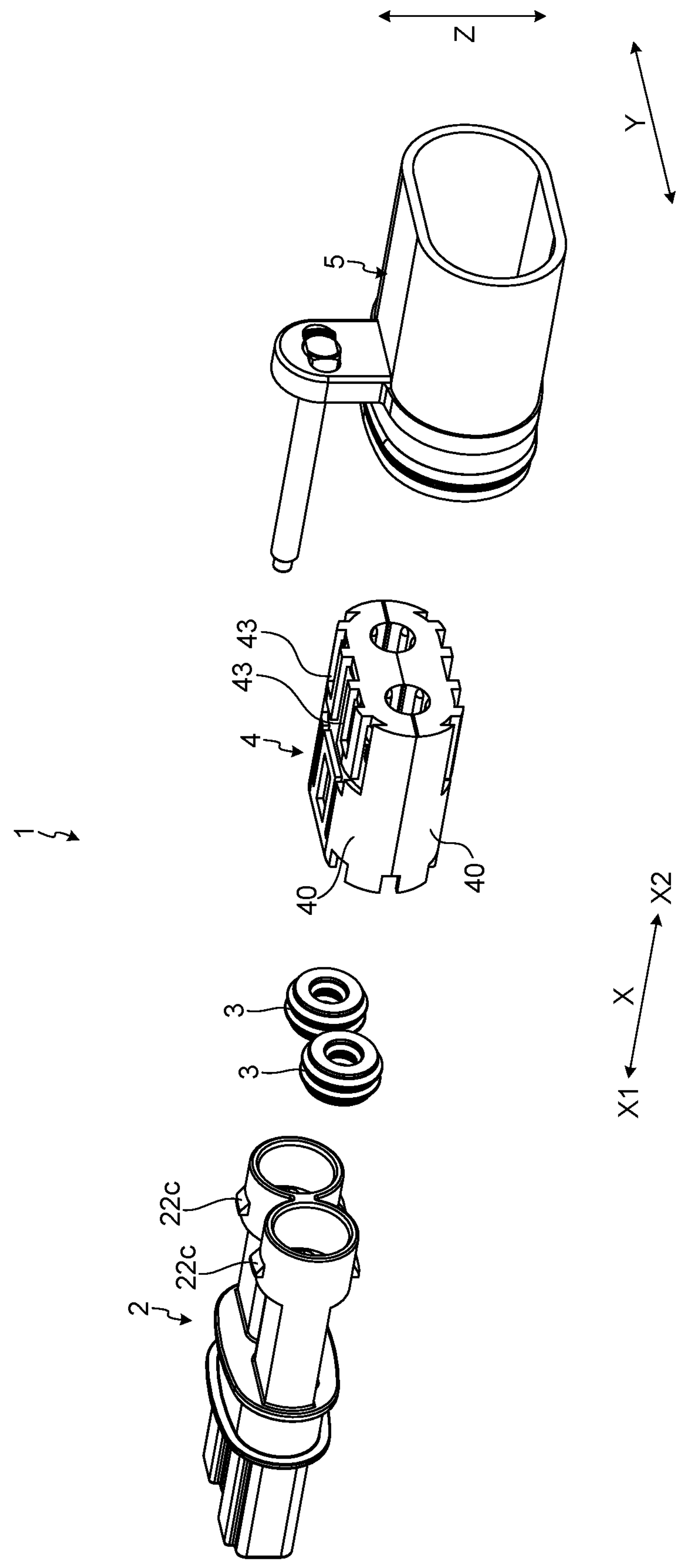
FIG. 2 is an exploded perspective view of the shield connector according to the embodiment.
Figure 3:
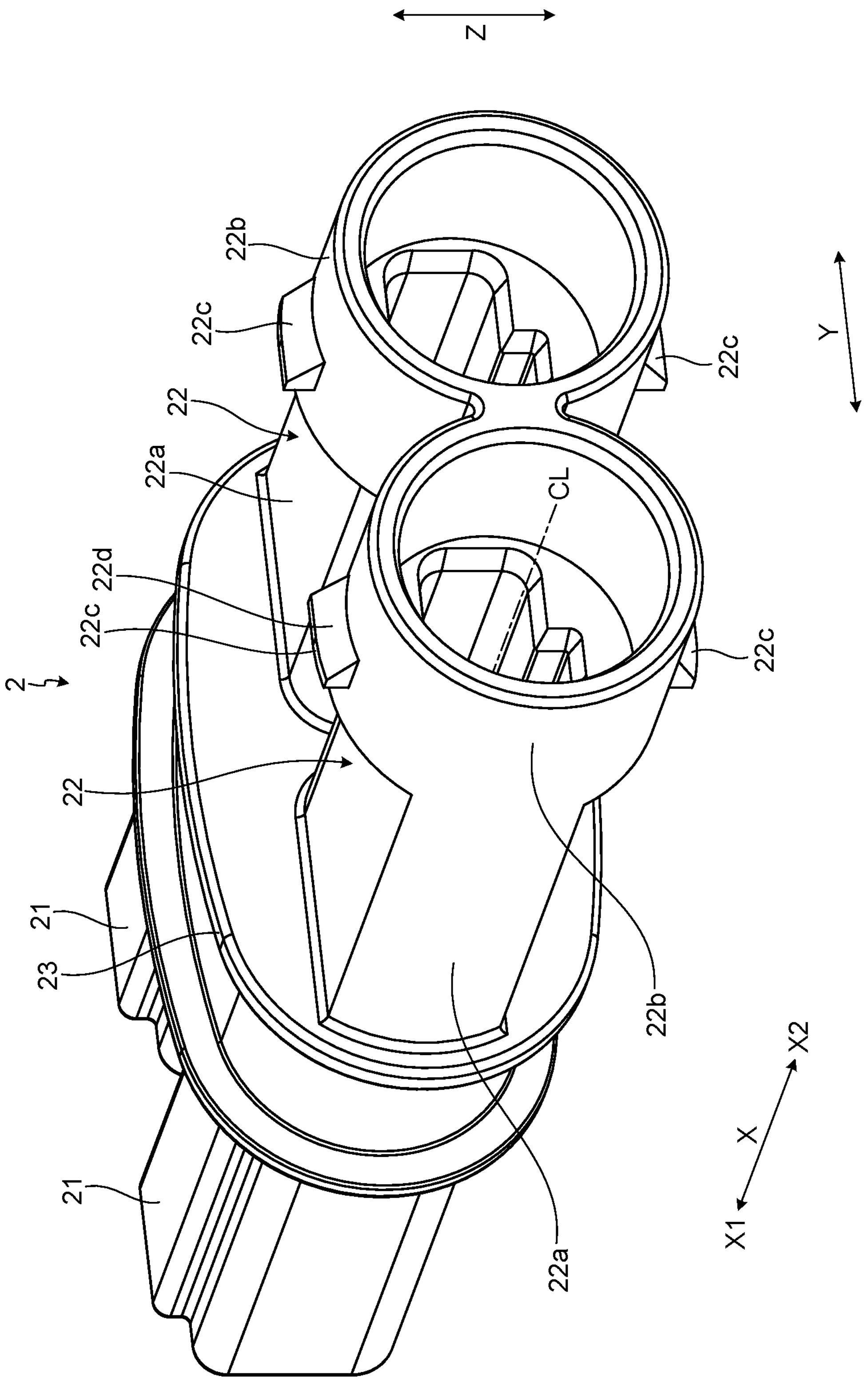
FIG. 3 is a perspective view of a housing according to the embodiment.
Figure 4:
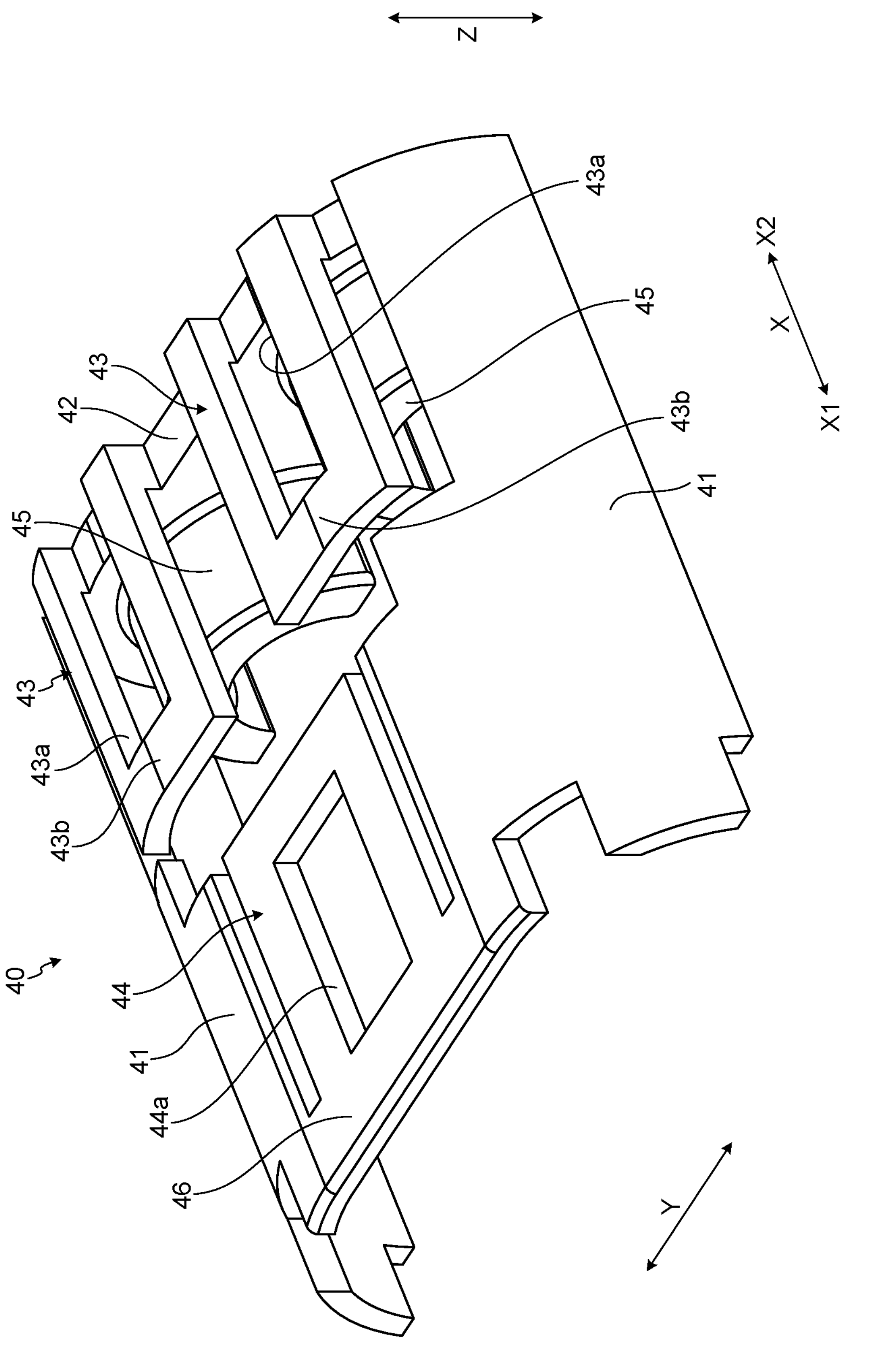
FIG. 4 is a perspective view of a support according to the embodiment.
Figure 5:
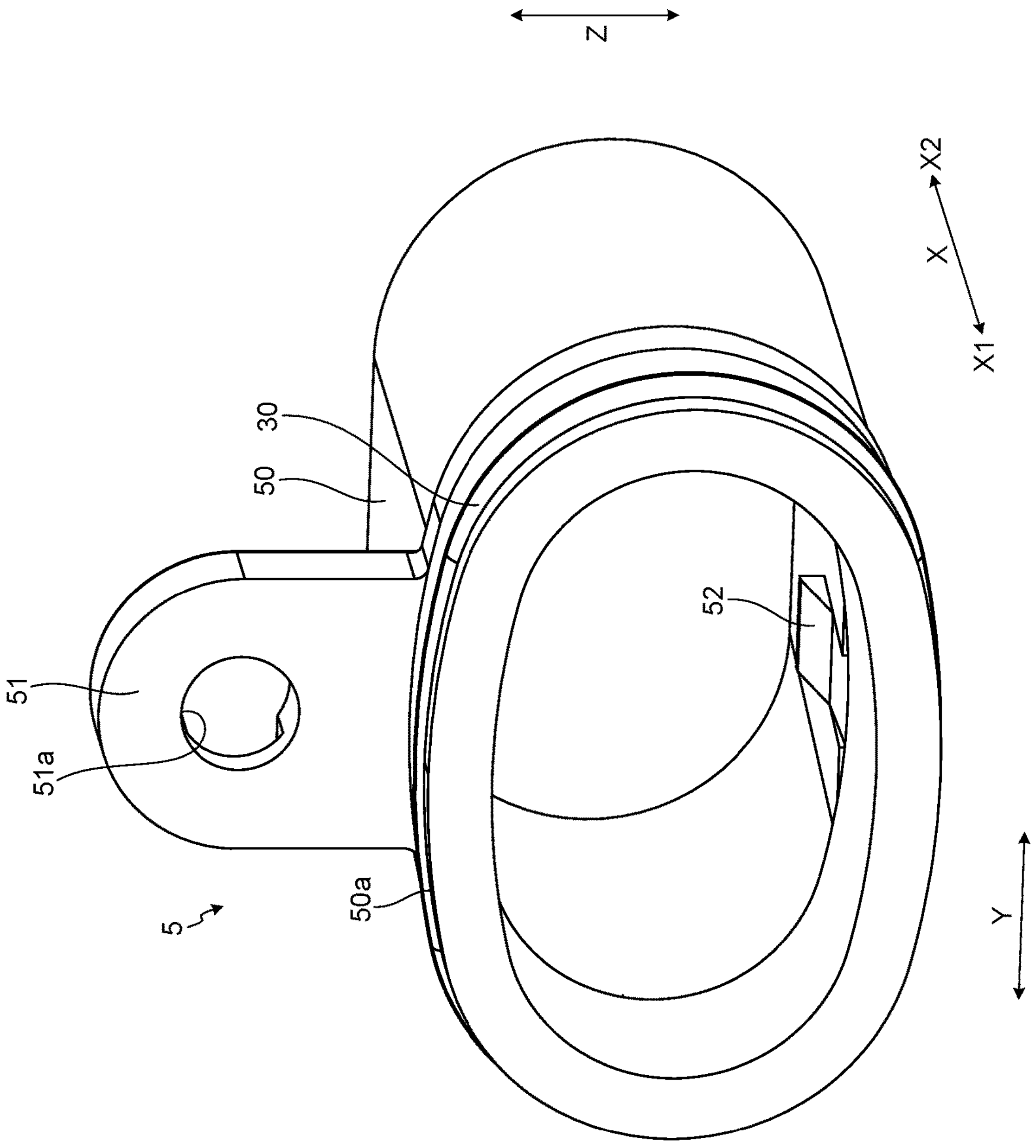
FIG. 5 is a perspective view of a shell according to the embodiment.
Figure 6:
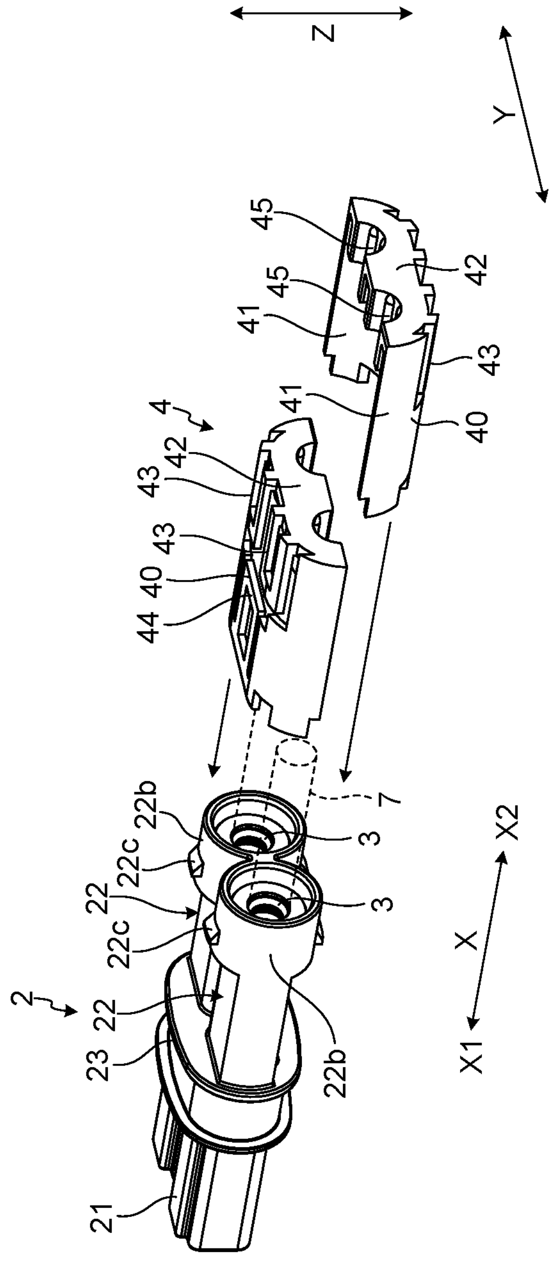
FIG. 6 is a perspective view of the housing and a holder according to the embodiment.
Figure 7:
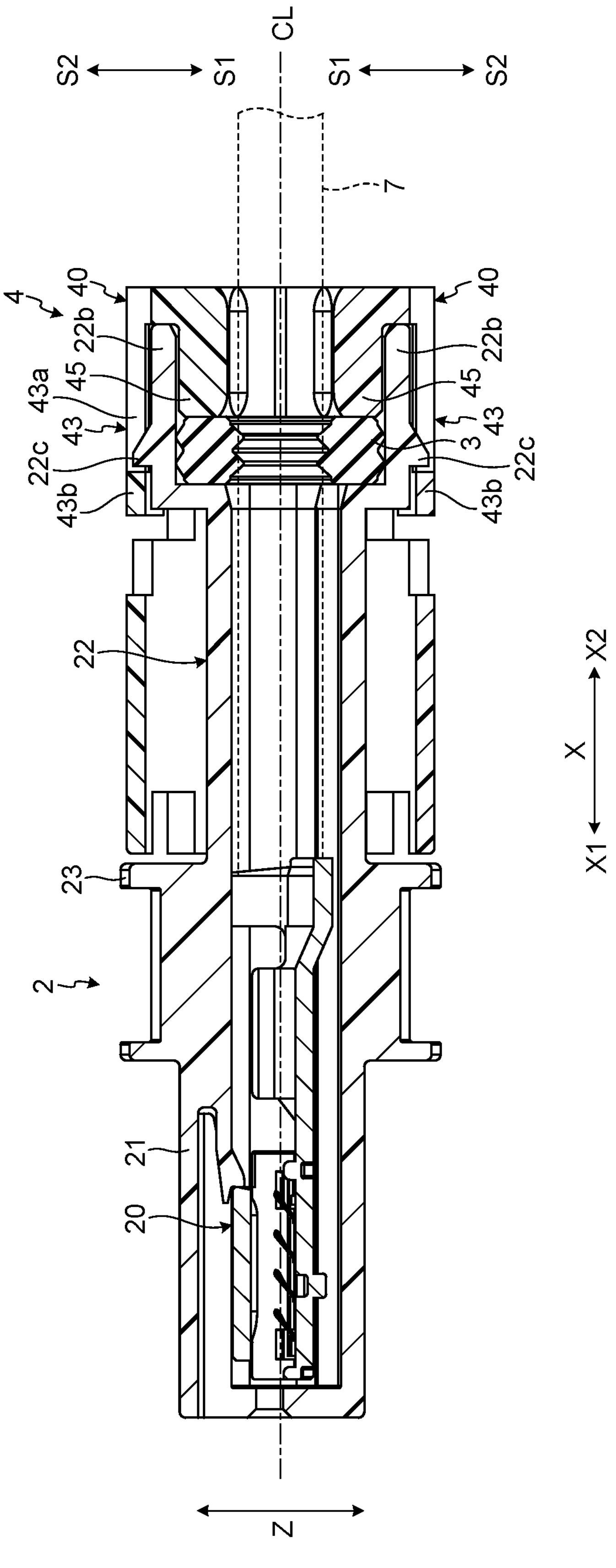
FIG. 7 is a cross-sectional view of a coupling body according to the embodiment.
Figure 8:
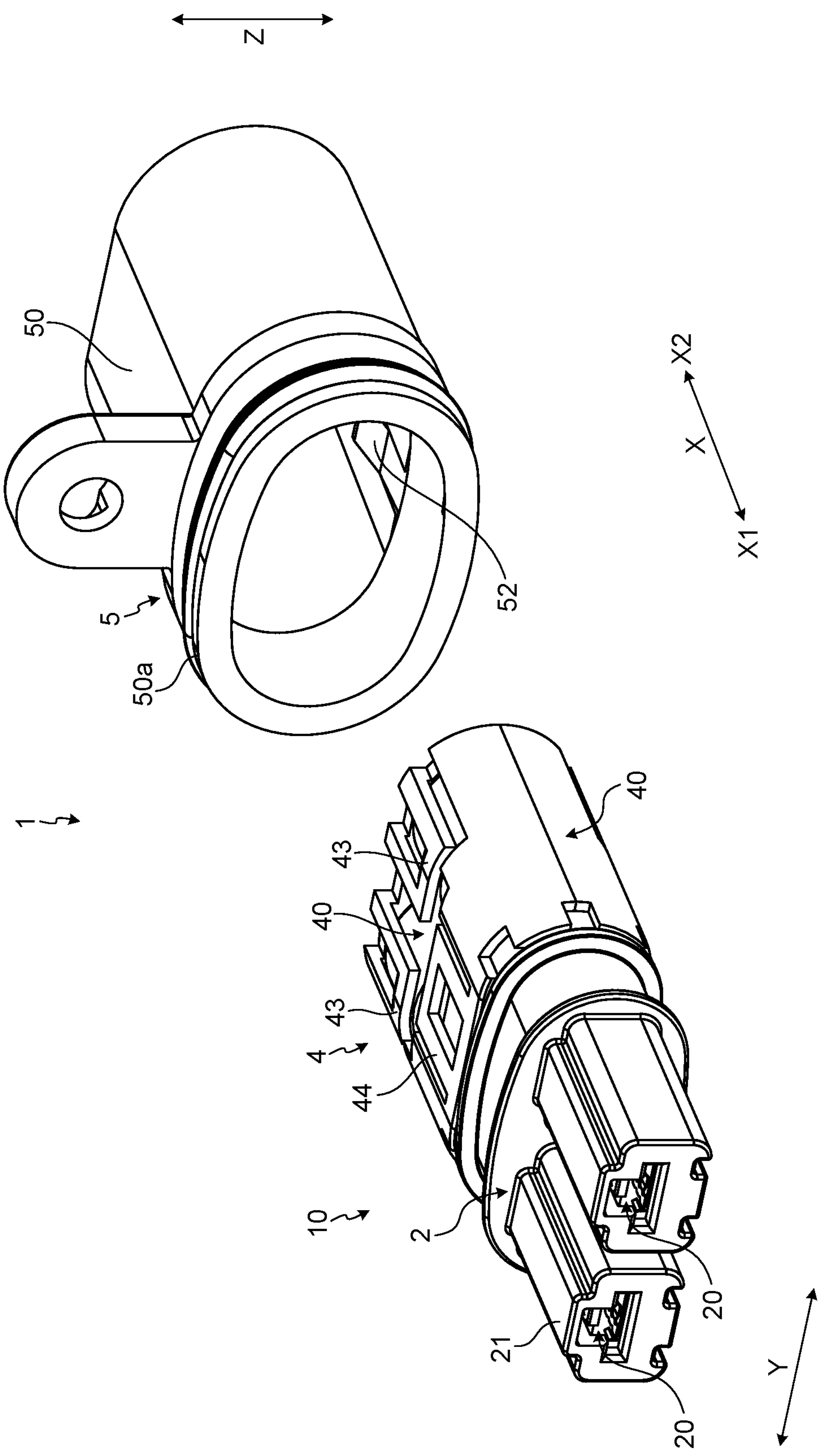
FIG. 8 is a perspective view of the coupling body and the shell according to the embodiment.
Figure 9:
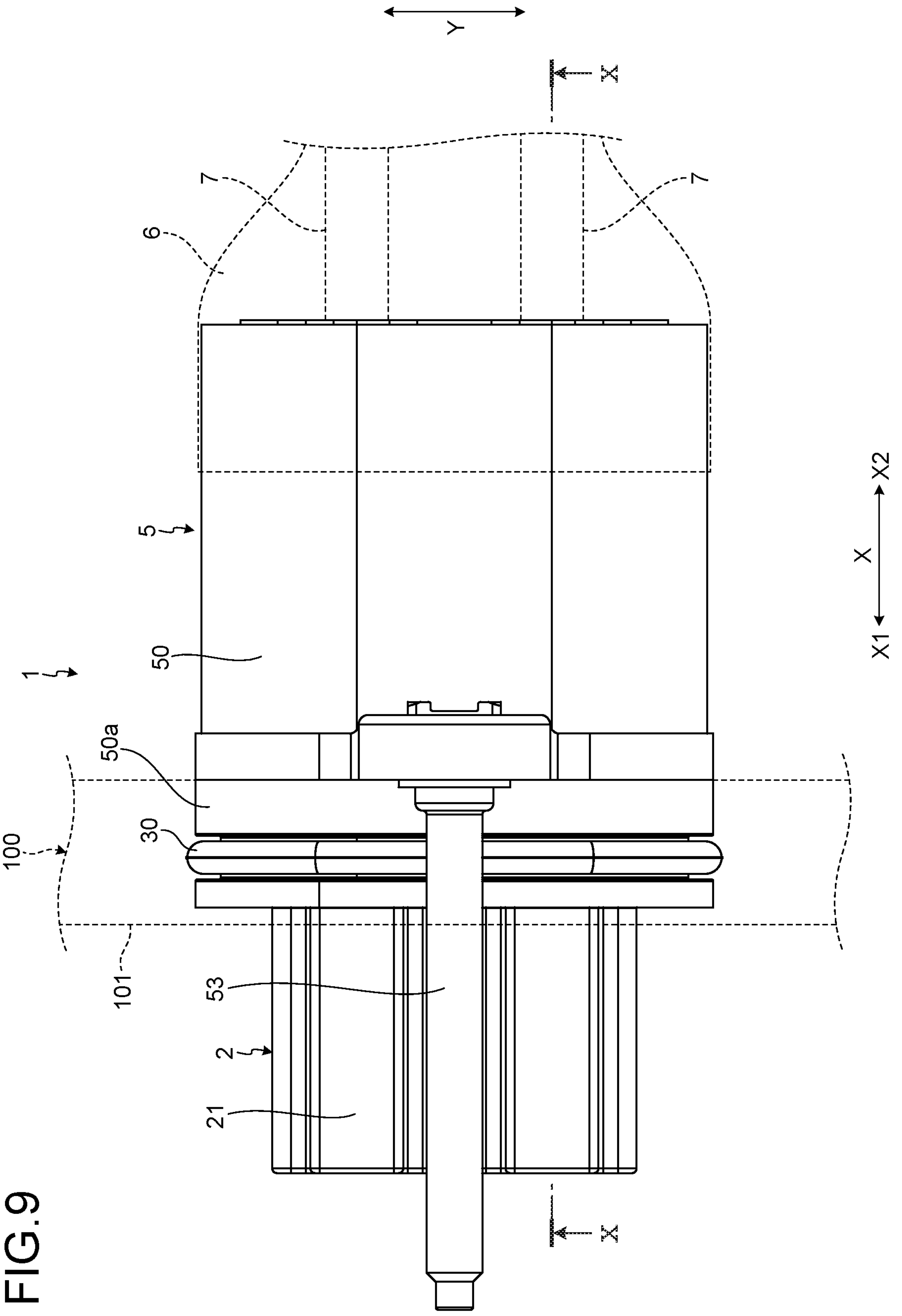
FIG. 9 is a plan view of the shield connector according to the embodiment.
Figure 10:
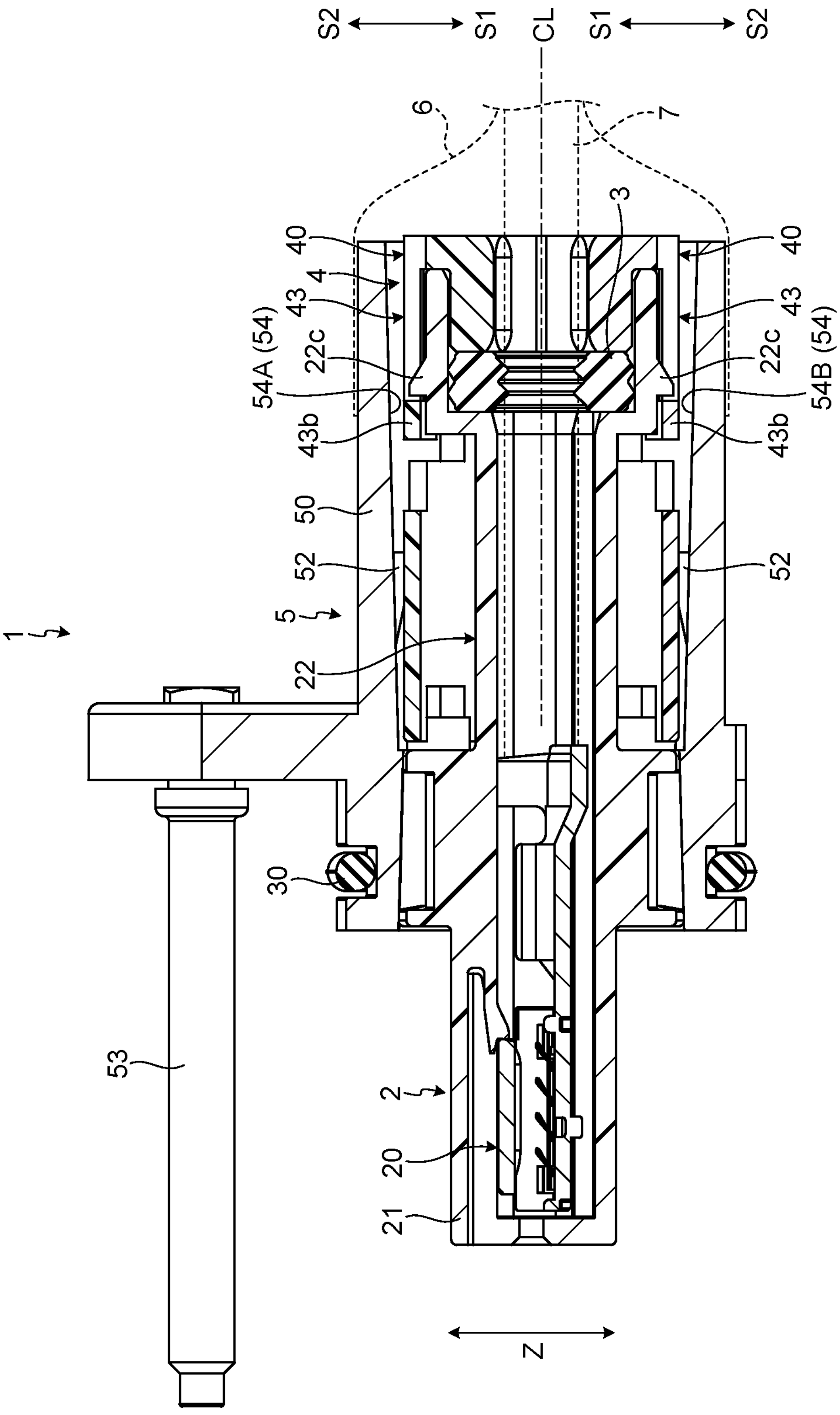
FIG. 10 is a cross-sectional view of the shield connector according to the embodiment.
Figure 11:
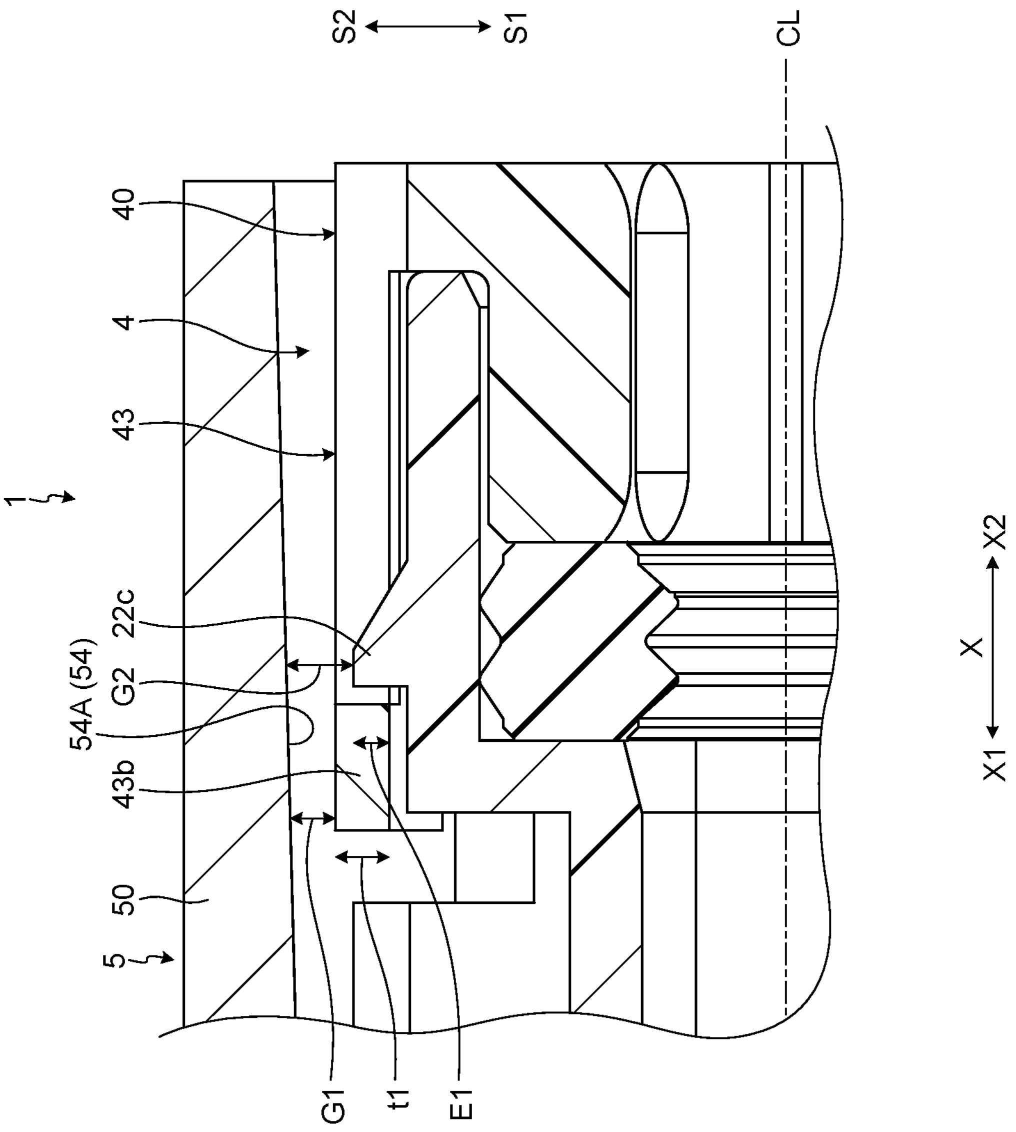
FIG. 11 is a cross-sectional view of a coupling structure according to the embodiment.
Figure 12:
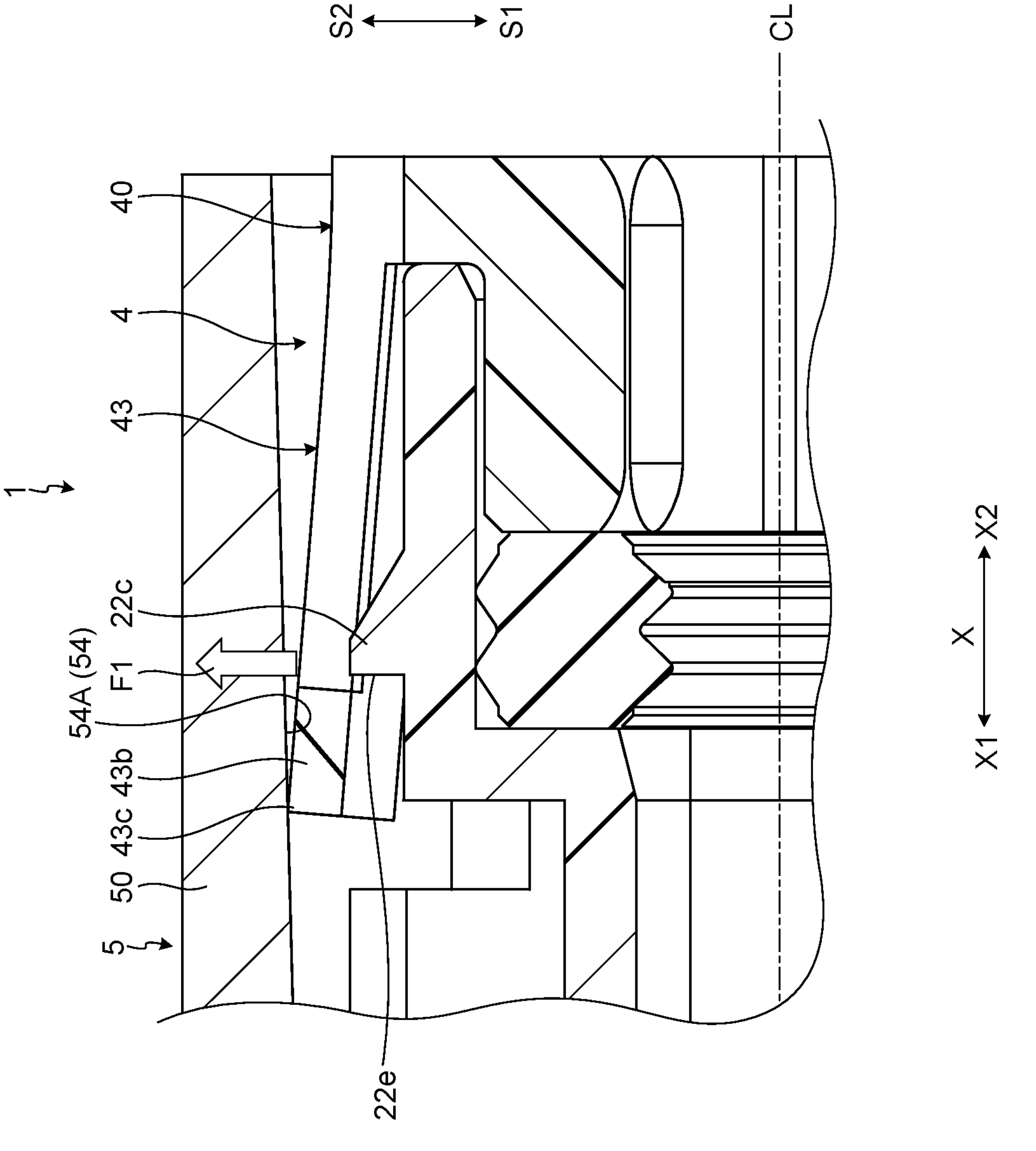
FIG. 12 is a cross-sectional view of the coupling structure according to the embodiment.

An embodiment will be described with reference to FIGS. 1 to 12. The present embodiment relates to a shield connector. FIG. 1 is a perspective view of a shield connector according to the embodiment, FIG. 2 is an exploded perspective view of the shield connector according to the embodiment, FIG. 3 is a perspective view of a housing according to the embodiment, FIG. 4 is a perspective view of a support according to the embodiment, FIG. 5 is a perspective view of a shell according to the embodiment, FIG. 6 is a perspective view of the housing and a holder according to the embodiment, FIG. 7 is a cross-sectional view of a coupling body according to the embodiment, FIG. 8 is a perspective view of the coupling body and the shell according to the embodiment, FIG. 9 is a plan view of the shield connector according to the embodiment, FIG. 10 is a cross-sectional view of the shield connector according to the embodiment, and FIGS. 11 and 12 are cross-sectional views of a coupling structure according to the embodiment. FIG. 10 illustrates a cross section taken along line X-X of FIG. 9.

A shield connector 1 of the present embodiment is connected to, for example, a device mounted on a vehicle such as an automobile. As illustrated in FIGS. 1 and 2, the shield connector 1 includes a housing 2, a seal member 3, a holder 4, and a shell 5. The shield connector 1 is connected with an electric wire 7 covered with a braid 6. The shell 5 is a cylindrical member formed of a metal having conductivity, and is referred to as a shield shell. An end portion of the braid 6 is fixed to the outer peripheral surface of the shell 5. The shell 5 is fixed to a casing of a device which is a connection destination, and is electrically connected to the casing. In other words, the braid 6 is grounded to the casing of the device via the shell 5.

The housing 2 is a cylindrical member that accommodates and holds a terminal connected to an end portion of the electric wire 7. The housing 2 is formed of, for example, an insulating synthetic resin. The electric wire 7 is drawn outward from an end portion of the housing 2. The seal member 3 is a member that seals between the outer peripheral surface of the electric wire 7 and the inner wall surface of the housing 2. The seal member 3 is formed of, for example, a resin having elasticity. The holder 4 is a member that is coupled to the housing 2 to support the seal member 3. The holder 4 is formed of, for example, an insulating synthetic resin. The illustrated holder 4 is formed by combining two supports 40.

The housing 2 and the holder 4 are inserted into the shell 5 in a state of being coupled to each other and are engaged with the shell 5. In the shield connector 1 of the present embodiment, as described below, the coupled state between the housing 2 and the holder 4 is maintained by the shell 5. The shell 5 regulates deformation of an engagement piece 43 of the holder 4 so that the coupled state is not released. Therefore, the shield connector 1 of the present embodiment can improve the robustness of the locking performance at the coupling portion.

As illustrated in FIG. 3, the housing 2 has a flat cylindrical shape extending linearly. In the following description, the axial direction of the housing 2 is referred to as an "axial direction X", and the width direction of the housing 2 is referred to as a "width direction Y". The electric wire 7 is drawn out from the housing 2 along the axial direction X. The housing 2 holds a plurality of electric wires 7 arranged in the width direction Y. A direction orthogonal to both of the axial direction X and the width direction Y is referred to as a "height direction Z".

The housing 2 has two holding portions 21 and two cylindrical portions 22. The holding portion 21 and the cylindrical portion 22 each extend in the axial direction X. The two holding portions 21 and the two cylindrical portions 22 are each arranged in the width direction Y. One holding portion 21 communicates with one cylindrical portion 22, and the other holding portion 21 communicates with the other cylindrical portion 22. The holding portion 21 is a portion that holds a terminal 20. The illustrated holding portion 21 has a rectangular cylindrical shape.

The cylindrical portion 22 is a portion through which the electric wire 7 is inserted. The cylindrical portion 22 has a base portion **22*a* and a tip portion 22*b*. The base portion 22*a* is a portion on the base end side of the cylindrical portion 22 and is connected to the holding portion 21. The base portion 22*a* has a rectangular cylindrical shape. The tip portion 22*b* is a portion on the tip side of the cylindrical portion 22, and is located on the side opposite to the side of the holding portion 21. The tip portion 22*b* has a cylindrical shape. The seal member 3 is inserted into the tip portion 22*b*. The seal member 3 seals between the outer peripheral surface of the electric wire 7 and the inner wall surface of the tip portion 22*b***.

The outer wall portion of the tip portion **22*b* has a protruding portion 22*c*. The protruding portion 22*c* protrudes from the outer peripheral surface of the tip portion 22*b* in a radial direction orthogonal to the axial direction X. One tip portion 22*b* has two protruding portions 22*c* protruding toward mutually opposite directions. The two protruding portions 22*c* each protrude along the height direction Z. The two protruding portions 22*c* are disposed symmetrically with respect to a central axis CL of the cylindrical portion 22. In other words, the two protruding portions 22*c* are 180° out of phase with each other. The shape of the protruding portion 22*c* when viewed from the axial direction X is substantially rectangular. A surface 22*d* on the tip side in the axial direction X of the protruding portion 22*c*** is an inclined surface inclined with respect to the height direction Z.

A flange portion 23 is provided at a connecting portion between the holding portion 21 and the cylindrical portion 22. The flange portion 23 is locked by the inner wall portion of the shell 5, thereby positioning the housing 2 in the axial direction X.

As illustrated in FIG. 4, the support 40 has a flat half-cylinder shape. The two supports 40 of the holder 4 have the same shape. The two supports 40 are combined to form a cylindrical body having an oval cross-sectional shape. One support 40 has a pair of side wall portions 41 and 41, a rear wall portion 42, a pair of engagement pieces 43 and 43, an engagement piece 44, and a pair of support walls 45 and 45. The rear wall portion 42 is located on a rear side X2 of the support 40 in the axial direction X. A front side X1 in the axial direction X indicates a front side in the engagement direction when the holder 4 is engaged with the housing 2. The rear side X2 indicates a side opposite to the front side X1 in the axial direction X.

The rear wall portion 42 is a flat plate-shaped wall portion orthogonal to the axial direction X. The pair of support walls 45 and 45 protrudes toward the front side X1 in the axial direction X from the rear wall portion 42. The support wall 45 has a half-cylinder shape and supports the seal member 3. The pair of support walls 45 and 45 is arranged in the width direction Y.

The side wall portion 41 is erected from an edge portion of the rear wall portion 42 toward the front side X1 in the axial direction X. One side wall portion 41 is connected to one end of the rear wall portion 42 in the width direction Y, and the other side wall portion 41 is connected to the other end of the rear wall portion 42 in the width direction Y. The cross-sectional shape of the side wall portion 41 is an arc shape.

The engagement piece 43 is a portion that is engaged with the housing 2 and couples the support 40 to the housing 2. The pair of engagement pieces 43 and 43 is erected from an edge portion of the rear wall portion 42 toward the front side X1 in the axial direction X. The engagement piece 43 is disposed between the pair of side wall portions 41 and 41. The pair of engagement pieces 43 and 43 is arranged in the width direction Y. One engagement piece 43 faces one support wall 45 in the height direction Z. The other engagement piece 43 faces the other support wall 45 in the height direction Z.

The base end of the engagement piece 43 is supported by the rear wall portion 42, and the tip of the engagement piece 43 is a free end. The engagement piece 43 has elasticity so as to be able to bend in the height direction Z. The shape of the engagement piece 43 when viewed from the height direction Z is substantially rectangular. The engagement piece 43 has a through-hole **43*a*. The through-hole 43*a* penetrates the engagement piece 43 along the height direction Z. The shape of the through-hole 43*a* when viewed from the height direction Z is substantially rectangular. The engagement piece 43 has a locked portion 43*b*. The locked portion 43*b* is a tip portion of the engagement piece 43 and is locked by the protruding portion 22*c* of the housing 2. The locked portion 43*b*** is plate-shaped and extends along the width direction Y.

The tips of the pair of side wall portions 41 are connected to each other by a connecting wall 46 extending along the width direction Y. The engagement piece 44 is a portion that is engaged with the shell 5 and is locked by the shell 5. The engagement piece 44 protrudes toward the rear side X2 in the axial direction X from the connecting wall 46. The tip of the engagement piece 44 faces the tips of the pair of engagement pieces 43 and 43 in the axial direction X. The shape of the engagement piece 44 when viewed from the height direction Z is substantially rectangular. The engagement piece 44 has a through-hole 44*a*. The through-hole 44*a* penetrates the engagement piece 44 along the height direction Z. The shape of the through-hole 44*a* when viewed from the height direction Z is substantially rectangular.

As illustrated in FIG. 5, the shell 5 includes a cylindrical main body 50, a fixing portion 51, and a protruding portion 52. The shape of the main body 50 in a cross section orthogonal to the axial direction X is an oval shape. The fixing portion 51 protrudes toward the height direction Z from the outer wall surface of the main body 50. The fixing portion 51 has a through-hole 51*a* through which a fastening member 53 can be inserted. The main body 50 has a fitting portion 50*a* that fits into an opening provided in the casing of the device. A seal member 30 is mounted on the outer wall surface of the fitting portion 50*a*. The seal member 30 seals between the fitting portion 50*a* and the opening of the casing.

The protruding portion 52 protrudes toward the height direction Z from the inner wall surface of the main body 50. The protruding portion 52 is engaged with the engagement piece 44 of the holder 4 to lock the holder 4. The shell 5 has two protruding portions 52 corresponding to the two supports 40.

As illustrated in FIG. 6, the two supports 40 are coupled to the housing 2 along the axial direction X. The two supports 40 are each attached to the housing 2 while sliding toward the front side X1 with respect to the housing 2. The engagement piece 43 of one of the supports 40 is engaged with the protruding portion 22*c* protruding toward one side in the height direction Z. The engagement piece 43 of the other of the supports 40 is engaged with the protruding portion 22*c* protruding toward the other side in the height direction Z.

As illustrated in FIG. 7, the engagement piece 43 of the support 40 is engaged with the protruding portion 22*c* of the housing 2 from an outer side S2. The outer side S2 is the side remote from the central axis CL of the cylindrical portion 22, and an inner side S1 is the side close to the central axis CL. When the engagement piece 43 is engaged with the protruding portion 22*c*, the locked portion 43*b* rides over the protruding portion 22*c*. At this point, the engagement piece 43 is bent and deformed toward the outer side S2. The protruding portion 22*c* enters the through-hole 43*a* of the engagement piece 43 and locks the locked portion 43*b*. The protruding portion 22*c* regulates the relative movement of the support 40 toward the rear side X2 with respect to the housing 2.

The support 40 holds the tip portion 22*b* of the housing 2 by sandwiching the tip portion 22*b* by the engagement piece 43 and the support wall 45. The tip surface of the support wall 45 abuts against the seal member 3 to support the seal member 3. As illustrated in FIG. 7, the holding portion 21 of the housing 2 holds the terminal 20. The electric wire 7 connected to the terminal 20 extends to an external space through an internal space of the cylindrical portion 22, the seal member 3 and the holder 4.

As illustrated in FIG. 8, the housing 2 and the holder 4 coupled to each other are inserted into the shell 5. A coupling body 10 in which the housing 2 and the holder 4 are coupled to each other is inserted into the shell 5 from the fitting portion 50*a* of the shell with the holder 4 as the first one to be inserted. The engagement piece 44 is engaged with the protruding portion 52 of the shell 5 and is locked by the protruding portion 52. The shell 5 accommodates and holds the coupling body 10 inside the shell 5.

As illustrated in FIG. 9, the shell 5 holding the coupling body 10 is attached to a wall portion 101 of a casing 100 of the device. The fitting portion 50*a* is inserted into an opening of the wall portion 101 and is fitted to the opening. The shell 5 is fixed to the wall portion 101 by the fastening member 53. The fastening member 53 is, for example, a bolt which is inserted into the through-hole 51*a* of the shell 5. In this case, a nut is screwed onto the fastening member 53 inserted into the wall portion 101. The holding portion 21 of the housing 2 is connected to, for example, a connector of a device. The terminal 20 is connected to a terminal of a mating connector.

As illustrated in FIG. 10, the shell 5 has a facing surface 54. The facing surface 54 is a surface facing the engagement piece 43 from the outer side S2. The facing surface 54 can regulate deformation of the engagement piece 43 toward the outer side S2. The facing surface 54 of the present embodiment is an inner peripheral surface of the main body 50. The shell 5 has a first facing surface 54A and a second facing surface 54B as the facing surfaces 54. The first facing surface 54A and the second facing surface 54B face each other in the height direction Z.

The first facing surface 54A faces the engagement piece 43 of one support 40. The second facing surface 54B faces the engagement piece 43 of the other support 40. In other words, the first facing surface 54A and the second facing surface 54B face each other with the two supports 40 interposed therebetween.

The facing surface 54 regulates deformation of the engagement piece 43 such as the one in which the locked portion 43*b* of the engagement piece 43 rides over the protruding portion 22*c*. As illustrated in the enlarged view of FIG. 11, the facing surface 54 faces the locked portion 43*b* in the height direction Z, and has a slight gap with the locked portion 43*b*. As illustrated in FIG. 12, when a force F1 toward the outer side S2 acts on the engagement piece 43, the facing surface 54 abuts against the engagement piece 43 to regulate deformation of the engagement piece 43. In other words, the shield connector 1 of the present embodiment has a double locking configuration in which the engagement piece 43 is locked by the protruding portion 22*c* in the axial direction X and the engagement piece 43 is locked by the facing surface 54 in the height direction Z.

In a state where the engagement piece 43 is abutted against the facing surface 54, a locking surface 22*e* of the protruding portion 22*c* faces the locked portion 43*b* in the axial direction X. In other words, the protruding portion 22*c* has a protruding amount sufficient to lock the locked portion 43*b* in a state where the engagement piece 43 is abutted against the facing surface 54. Thus, the locked state in which the engagement piece 43 is engaged with the protruding portion 22*c* is maintained. Therefore, the shield connector 1 of the present embodiment can improve the robustness of the locking performance at the coupling portion between the engagement piece 43 and the protruding portion 22*c*.

Referring back to FIG. 11, the value of a gap width G1 between the locked portion 43*b* and the facing surface 54 is, for example, less than or equal to an overlap width E1. The overlap width E1 is an engagement margin of the locked portion 43*b* with respect to the protruding portion 22*c*, and is a width in the height direction Z of a portion where the locked portion 43*b* and the protruding portion 22*c* overlap each other when viewed from the axial direction X. Such a configuration allows the facing surface 54 to maintain the engagement state between the engagement piece 43 and the protruding portion 22*c*.

The value of a gap width G2 between the tip of the protruding portion 22*c* and the facing surface 54 is, for example, less than or equal to a thickness t1 of the locked portion 43*b*. Such a configuration allows the facing surface 54 to regulate deformation of the engagement piece 43 such as the one in which the lock is released.

The facing surface 54 of the present embodiment is an inclined surface inclined with respect to the axial direction X. The facing surface 54 is inclined with respect to the axial direction X so as to be away from the central axis CL as the facing surface extends toward the rear side X2. As illustrated in FIG. 12, when the engagement piece 43 is deformed toward the outer side S2, the facing surface 54 supports a tip 43*c* of the engagement piece 43. Since the facing surface 54 is inclined, the facing surface 54 abuts against the engagement piece 43 at a stage where the amount of deformation of the engagement piece 43 is small, thereby regulating further deformation of the engagement piece 43. Therefore, the facing surface 54 of the present embodiment can appropriately suppress unintentional release of the lock.

As described above, the shield connector 1 of the present embodiment includes the cylindrical housing 2, the annular seal member 3, the holder 4, and the conductive shell 5. The housing 2 accommodates the terminal 20 and holds the terminal 20. The seal member 3 seals between the outer peripheral surface of the electric wire 7 connected to the terminal 20 and the inner wall surface of the housing 2. The holder 4 is coupled to the housing 2 along the axial direction X of the housing 2 to support the seal member 3. The shell 5 accommodates and holds the housing 2 and the holder 4 which are coupled to each other therein.

The outer wall portion of the housing 2 has the protruding portion 22*c* protruding outward. The holder 4 has the engagement piece 43 extending along the axial direction X. The holder 4 is coupled to the housing 2 by engaging the engagement piece 43 with the protruding portion 22*c* from the outside. The shell 5 has the facing surface 54 facing the engagement piece 43 from the outside. The shell 5 regulates outward deformation of the engagement piece 43 by the facing surface 54. The shield connector 1 of the present embodiment can improve the robustness of the coupling portion between the housing 2 and the holder 4.

In the shield connector 1 of the present embodiment, since the engagement piece 43 is sandwiched between the housing 2 and the facing surface 54, the engagement piece 43 cannot be easily touched from the outside. In other words, the shield connector 1 is configured such that the coupling between the housing 2 and the holder 4 cannot be easily released. Therefore, the possibility that the shield connector 1 is disassembled by a person other than an authorized worker is reduced.

The holder 4 of the present embodiment includes two half-cylindrical supports 40 which are mounted on the outside of the housing 2 along the axial direction X. The two supports 40 each have the engagement piece 43. In the housing 2, the protruding portion 22*c* corresponding to one of the supports 40 and the protruding portion 22*c* corresponding to the other of the supports 40 protrude toward mutually opposite directions. The shell 5 has the first facing surface 54A and the second facing surface 54B. The first facing surface 54A faces the engagement piece 43 of one of the supports 40, and the second facing surface 54B faces the engagement piece 43 of the other of the supports 40. The shield connector 1 of the present embodiment can improve the robustness of each of the coupling portion between the housing 2 and one of the supports 40 and the coupling portion between the housing 2 and the other of the supports 40.

Note that the configuration in which the shield connector 1 holds the coupling body 10 is not limited to the combination of the engagement piece 44 of the holder 4 and the protruding portion 52 of the shell 5. For example, the shell 5 may hold the coupling body 10 by locking the housing 2.

The number of terminals 20 held by the shield connector 1 is not limited to two as illustrated. For example, the shield connector 1 may hold three or more terminals 20.

The number of engagement pieces 43 included in one support 40 is not limited to two as illustrated. For example, the number of the engagement pieces 43 included in one support 40 may be one or three or more. The holder 4 may not be divided into two supports 40. In other words, the holder 4 may be integrally molded in a shape in which two supports 40 are combined.

In the engagement piece 43, the portion into which the protruding portion 22*c* is inserted is not limited to the through-hole 43*a*. For example, in the engagement piece 43, the portion into which the protruding portion 22*c* is inserted may be a recessed portion recessed along the height direction Z.

The contents disclosed in the above embodiments can be performed in combination as appropriate.

In the shield connector according to the present embodiment, a shell has a facing surface facing the engagement piece from the outside, and regulates outward deformation of the engagement piece by the facing surface. The shield connector according to the present embodiment exhibits an effect that can improve the robustness of the coupling portion between the housing and the holder.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A shield connector comprising:

a cylindrical housing that accommodates a terminal and holds the terminal;

an annular seal member that seals between an outer peripheral surface of an electric wire connected to the terminal and an inner wall surface of the housing;

a holder coupled to the housing along an axial direction of the housing to support the seal member; and a conductive shell that accommodates and holds the housing and the holder coupled to each other in the conductive shell, wherein an outer wall portion of the housing has a protruding portion protruding outward, the holder has an engagement piece extending along the axial direction and is coupled to the housing by engaging the engagement piece with the protruding portion from an outside, the engagement piece overlaps the protruding portion in a first direction by an overlap width, the first direction intersects the axial direction, and the shell has a facing surface facing the engagement piece from an outside, the facing surface is spaced away from the engagement piece by a first gap that is less than or equal to the overlap width such that the shell regulates outward deformation of the engagement piece by the facing surface.

2. The shield connector according to claim 1, wherein
the holder includes two half-cylindrical supports that are mounted on the outside of the housing along the axial direction,
the two supports each have the engagement piece,
in the housing, the protruding portion corresponding to one of the supports and the protruding portion corresponding to the other of the supports protrude toward mutually opposite directions, and
the shell has a first facing surface facing the engagement piece of one of the supports and a second facing surface facing the engagement piece of the other of the supports.

3. The shield connector according to claim 1, wherein
the engagement piece has a thickness measured in the first direction, and
the facing surface is spaced away from the protruding portion by a second gap that is less than or equal to the thickness.

4. The shield connector according to claim 1, wherein
the holder includes:
a rear wall portion;
a pair of side wall portions that are connected to extend from the rear wall portion in the axial direction;
a connecting wall portion that is spaced away from the rear wall portion in the axial direction and connects the pair of the side wall portions to each other; and
a second engagement piece that protrudes from the connecting wall and toward the rear wall in the axial direction, and
the shell includes a second protruding portion that engages the second engagement piece.

* * * * *